US011871168B2

(12) United States Patent
Tiefenau et al.

(10) Patent No.: US 11,871,168 B2
(45) Date of Patent: Jan. 9, 2024

(54) HEARING DEVICE WITH TWO MICROPHONE FILTERS

(71) Applicant: GN Hearing A/S, Ballerup (DK)

(72) Inventors: Andreas Tiefenau, Holte (DK); Timea Denisa Merca, Køge (DK); Anders Hjermø Michaelsen, Bagsværd (DK)

(73) Assignee: GN HEARING A/S, Ballerup (DK)

(*) Notice: Subject to any disclaimer, the term of this patent is extended or adjusted under 35 U.S.C. 154(b) by 0 days.

(21) Appl. No.: 18/108,012

(22) Filed: Feb. 10, 2023

(65) Prior Publication Data

US 2023/0188912 A1 Jun. 15, 2023

Related U.S. Application Data

(63) Continuation of application No. 17/513,357, filed on Oct. 28, 2021, now Pat. No. 11,638,107.

(30) Foreign Application Priority Data

Nov. 11, 2020 (DK) ............................ PA202070744

(51) Int. Cl.
*H04R 25/00* (2006.01)

(52) U.S. Cl.
CPC .................................... *H04R 25/65* (2013.01)

(58) Field of Classification Search
CPC .......... H04R 1/326; H04R 1/08; H04R 3/005; H04R 1/02; H04R 1/342; H04R 19/04; H04R 25/505; H04R 25/554
See application file for complete search history.

(56) References Cited

U.S. PATENT DOCUMENTS 6,795,562 B1 * 9/2004 Gunnersen ........... H04R 25/654 381/325
2003/0142843 A1 7/2003 Meier
(Continued)

FOREIGN PATENT DOCUMENTS

DE 10 2009 060685 6/2011
EP 3163912 5/2017
(Continued)

OTHER PUBLICATIONS

Non-Final Office Action for U.S. Appl. No. 17/513,357 dated Aug. 10, 2022.
(Continued)

*Primary Examiner* — Amir H Etesam
(74) *Attorney, Agent, or Firm* — Vista IP Law Group, LLP

(57) ABSTRACT

A hearing device and related methods are disclosed. The hearing device comprises a housing comprising a wall, a microphone inlet comprising a through-going opening, a microphone arranged within the housing for receiving audio via the microphone inlet, a first filter device comprising a first filter material, the first filter device being arranged at the microphone, and a second filter device substantially having the shape of a torus or a hollow cylinder and comprising a second filter material, the second filter device being arranged at the wall, wherein the first filter device is arranged between the microphone and the second filter device, and wherein the through-going opening comprises an outer recess in an outer surface of the wall, wherein the second filter device is arranged in the outer recess.

21 Claims, 7 Drawing Sheets

(56) References Cited

U.S. PATENT DOCUMENTS

| | | | |
|---|---|---|---|
| 2009/0180653 | A1 | 7/2009 | Sjursen et al. |
| 2010/0208930 | A1 | 8/2010 | Kopnov et al. |
| 2016/0071506 | A1 | 3/2016 | Qutub et al. |
| 2019/0145806 | A1 | 5/2019 | Lim et al. |
| 2020/0053458 | A1 | 2/2020 | Ring et al. |
| 2020/0169818 | A1 | 5/2020 | Rombach et al. |

FOREIGN PATENT DOCUMENTS

| | | | |
|---|---|---|---|
| JP | H08251698 | A | 9/1996 |
| WO | WO1997009864 | A1 | 3/1997 |
| WO | WO 00/03561 | | 1/2000 |
| WO | WO2000002419 | A1 | 1/2000 |
| WO | WO 2008/025355 | | 3/2008 |

OTHER PUBLICATIONS

Notice of Allowance for U.S. Appl. No. 17/513,357 dated Jan. 10, 2023.
Extended European Search Report for EP Patent Appln. No. EP 21205611.3 dated Mar. 25, 2022.
Foreign OA for Danish Patent Appln. No. PA 2020 70744 dated Feb. 16, 2021.

* cited by examiner

HEARING DEVICE WITH TWO MICROPHONE FILTERS

RELATED APPLICATION DATA

This application is a continuation of U.S. patent application Ser. No. 17/513,357 filed on Oct. 28, 2021, which claims priority to, and the benefit of, Danish Patent Application No. PA 202070744 filed on Nov. 11, 2020. The entire disclosures of the above applications are expressly incorporated by reference herein.

FIELD

The present disclosure relates to a hearing device and related methods including a method of mounting a filter device on a hearing device.

BACKGROUND

Hearing devices comprising electronic circuits with electronic components, such as microphones and/or receivers, may often be exposed to particles and dirt from the surrounding environments of the hearing devices. Particles and dirt may penetrate hearing devices via openings in the hearing devices, e.g. via microphone inlets. It is therefore desirable to protect the hearing devices to avoid that undesired particles and dirt penetrate the hearing devices and potentially damage electronic components or prevent the electric components from working properly. Today, the protection of the hearing devices from the environment is performed via a filter, e.g. a filter in a hearing device opening. However, a drawback of using such filters is that the filters get clogged in time, which in turn results in reduced efficiency of hearing devices.

SUMMARY

Accordingly, there is a need for hearing devices and methods with improved hearing device protection, such as improved ingress protection.

A hearing device is disclosed. The hearing device comprises a housing comprising a wall, a microphone inlet comprising a through-going opening, a microphone arranged within the housing for receiving audio via the microphone inlet, a first filter device comprising a first filter material, the first filter device being arranged at the microphone, and a second filter device comprising a second filter material, the second filter device being arranged at the wall, wherein the first filter device is optionally arranged between the microphone and the second filter device. The second filter device may substantially have the shape of a torus or a hollow cylinder. The through-going opening optionally comprises an outer recess in an outer surface of the wall, wherein the second filter device is optionally arranged in the outer recess.

Further, a method of mounting a filter device on a hearing device comprising a housing comprising a wall, a microphone inlet, a microphone arranged within the housing for receiving audio via the microphone inlet, and a first filter device is provided, the method comprising: compressing a second filter device, inserting the compressed second filter device in the housing via the microphone inlet.

It is an advantage of the present disclosure that protection of the hearing device, e.g. of the electronic components, such as the microphone, of the hearing device, is improved. The present disclosure provides a hearing device with improved ingress protection, which in turn may prolong the lifetime of the hearing device.

Further, it is an advantage that of the present disclosure that the performance and the efficiency of the hearing device, e.g. of the electronic components, such as of the microphone, is maintained in time. For example, the sensitivity of the hearing device may be prolonged.

Further, the frequency of maintenance intervals of the hearing device may be reduced.

By providing a second filter device, the lifetime of the first filter device and in turn of the hearing device is prolonged. The second filter device may protect the first filter device from solid and liquid particles. By having the first filter device arranged between the second filter device and the microphone, the first filter device may have a longer durability or lifetime before being clogged and reducing the performance of the hearing device, e.g. blocking for audio or partly for audio in the microphone inlet, such that the audio received by the microphone is reduced.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
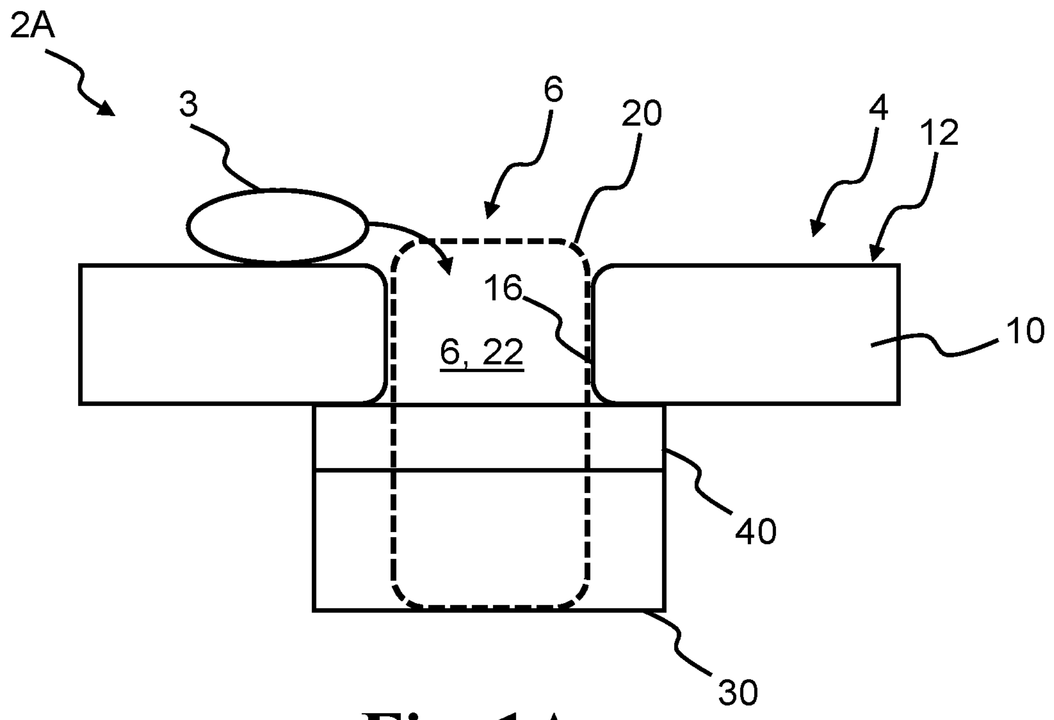
FIG. 1A shows a cross-sectional view of a hearing device without a second filter device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable, e.g. an ear bud, or a hearing aid. In a hearing aid, the processor is configured to compensate for a hearing loss or hearing deficiency of a user. In other words, the processor may be configured to compensate for a hearing loss or hearing deficiency of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

The hearing device may be configured for wireless communication with one or more devices, such as with another hearing device, e.g. as part of a binaural hearing system, and/or with one or more accessory devices, such as a smartphone and/or a smart watch. The hearing device optionally comprises an antenna for converting one or more wireless input signals, e.g. a first wireless input signal and/or a second wireless input signal, to antenna output signal(s). The wireless input signal(s) may origin from external source (s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device optionally comprises a pre-processing unit. The pre-processing unit may be connected to a radio transceiver for pre-processing transceiver input signal(s). The pre-processing unit may be connected the first microphone for pre-processing the first microphone input signal. The pre-processing unit may be connected the second microphone if present for pre-processing the second microphone input signal. The pre-processing unit may comprise one or more ND-converters for converting analog microphone input signal(s) to digital pre-processed microphone input signal(s).

The hearing device comprises a processor for processing input signals, such as pre-processed transceiver input signal and/or pre-processed microphone input signal(s). The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a processor for processing input signals, such as pre-processed transceiver input signal (s) and/or pre-processed microphone input signal(s). The processor is optionally configured to compensate for hearing loss of a user of the hearing device. The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

In the following, whenever referring to proximal side or surface of a layer, an element, a device or part of a device, the referral is to the side closest to the microphone of the hearing device. Likewise, whenever referring to the distal side or surface of a layer, an element, a device or part of a device, the referral is to the side furthest away from the microphone of the hearing device.

A hearing device is disclosed. The hearing device comprises a housing comprising a wall. The wall may be located at an outer surface or outer side of the hearing device, e.g. the outer surface of the wall may face away from the hearing device and towards the environment that the hearing device operates in when in use.

The hearing device comprises a microphone inlet comprising a through-going opening, e.g. in the wall of the housing, such as at the outer surface of the wall. In other words, the hearing device may comprise an outer opening formed in the housing, e.g. in the wall, at a first end of the microphone inlet. The microphone inlet may be understood as a microphone port system of the hearing device.

The hearing device comprises a microphone arranged within the housing for receiving audio via the microphone inlet.

The hearing device optionally comprises a plurality of filter devices including a first filter device and/or a second filter device, wherein the first filter comprises and/or is made of a first filter material and/or the second filter device comprises and/or is made of a second filter material. The first filter material and/or the second filter material may be a polyester foam material, e.g. a polyester monofilament foam material.

In the hearing device, the first filter device may be arranged at the microphone. The first filter device being arranged at the microphone may be understood as the first filter device being closer to the microphone than the second filter device. The first filter device being arranged at the microphone may be understood as being arranged at a distance to the microphone, i.e. not in contact with the microphone. The first filter device being arranged at the microphone may optionally be understood as being arranged on the microphone, i.e. in contact with the microphone. The first filter device may comprise one or more filter materials, including the first filter material and optionally a second filter material. The first filter device, e.g. the first filter material, may have a porosity in the range of 80% to 100%, 85% to 98%, and/or 90% to 95%.

The housing may comprise a distal part, a middle part, and/or a proximal part. The distal part may comprise the wall and/or the through-going opening. The distal part may be a part of the housing located closest to the outer opening. The middle part may be a part of the housing located between the microphone and the first filter device and/or the second filter device. The proximal part be a part of the housing located closest to the microphone. The distal part and/or the middle part may comprise the microphone inlet and/or the through-going opening. The first filter device may be arranged between the middle part and the distal part of the housing. In other words, the distal part of the housing and the middle part of the housing may form a hollow space for arranging and/or accommodating the first filter device and/or the second filter device in the housing.

The first filter device may comprise a first attachment device, e.g. as one or more adhesive portions. The first filter device may, in a mounted state, have a first height, a first width, and a first depth. The first filter device may be a HD15 foam filter having an average pore size of 15 μm. The first filter device may be a HD12 foam filter having an average pore size of 12 μm. The first filter device may be a HD10 foam filter having an average pore size of 10 μm. The first filter device may be a HD7 foam filter having an average pore size of 7 μm.

The first filter device may have a first height F_H in the range from 10 μm to 1 mm, 10 μm to 500 μm, 50 μm to 300 μm, and/or 80 μm to 200 μm. The first filter device may have a first height F_H of 85 μm.

The first filter device may have a first width in the range from 0.5 mm to 5 mm.

The first filter device may have a first depth in the range from 0.5 mm to 5 mm.

The second filter device may optionally comprise or be made of a second filter material. The second filter device may comprise one or more filter materials, including the second filter material and optionally a third filter material. Optionally, the first filter device and the second filter device are comprised in one filter device, e.g. the first filter device and the second filter device being comprised in one filter unit.

The second filter device may be arranged at the wall of the housing. In one or more exemplary hearing devices, the first filter device is arranged between the microphone and the second filter device. In other words, the first filter may be arranged downstream the second filter in the sound path from the outside to the microphone via the microphone inlet.

The second filter device may be configured to act as a pre-filter in the hearing device, e.g. in the microphone inlet. For example, the second filter device may be configured to act as a rough filter in the hearing device, e.g. such that the first filter device avoids getting clogged by debris or particles that are caught by the second filter. The second filter device may be configured to collect or take up one or more of particles, debris, dirt, dust, earwax, water, moist, sweat, cerumen, and dead skin. In other words, the second filter device may be configured to stop particles or liquid with high viscosity from landing on the first filter device, e.g. liquids with a viscosity in the range from 1 Pa·s to 10000 Pa·s. By having the first filter device arranged between the second filter device and the microphone, the first filter device may have a longer durability or lifetime before being clogged. When the first filter device becomes clogged, the performance of the hearing device may be reduced, e.g. the first filter device may block, distort, or attenuate audio. In other words, when clogged, the first filter device may partly block, distort, or attenuate audio in the microphone inlet, such that the audio received by the microphone is distorted.

The second filter device being arranged at the wall may be understood to mean that the second filter device is closer to the wall than the first filter device. The second filter device may be arranged at a distance from the wall, e.g. in the microphone inlet, such as in an inner recess located in the through-going opening.

The second filter device may be arranged between the middle part and the distal part of the housing, e.g. the distal part of the housing and the middle part of the housing. In other words, the distal part of the housing and the middle part of the housing may form a hollow space for arranging and/or accommodating the second. The second filter device may be arranged between a first part of the distal part and a second part of the distal part. In other words, the through going opening may be formed between the first part and the second part of the distal part, and/or between a first part of the middle part and a second part of the middle part. The second filter device may be arranged in the through going opening. The second filter device may be arranged to cover the through going opening.

The second filter device may be configured for being in at least two states including an uncompressed state and a compressed state. In other words, the second filter device may be elastically deformable.

The second filter device may comprise a second attachment device. The second attachment device may comprise one or more adhesive portions for attaching the second filter device to the hearing device. The second filter device may be attached in the microphone inlet, e.g. in the hearing device housing. The second filter device may, in a mounted state, e.g. an uncompressed state, have a second primary height, a second primary width, and a second primary depth. Optionally, the second filter device may be compressed in a mounted state, e.g. partially compressed, where the second filter device may exert pressure on the inner surface, such as side-walls, of the through-going opening, and may thereby be compressed in a mounted state.

The second primary width, the second primary height, and the second primary depth may depend on the dimensions of the wall and/or the microphone inlet. For example, the second filter device may be compressed by the inner surface of the through-going opening, such that the second primary width, the second primary height, and/or the second primary depth correspond to the dimensions of the microphone inlet or the dimensions of the wall. The second primary width SP_W may be in the range of 0.5 mm to 5 mm, 1 mm to 3 mm, 1.5 mm to 2 mm.

The second primary height SP_H may be in the range of 0.5 mm to 5 mm, 1 mm to 3 mm, 1.5 mm to 2 mm. The second primary depth may be in the range of 0.5 mm to 5 mm, 1 mm to 3 mm, 1.5 mm to 2 mm.

The second filter device may, in a compressed state, have a second secondary height, a second secondary width, and a second secondary depth. The second secondary width may be in the range of 0.5 mm to 5 mm, 0.5 mm to 3 mm, 0.9 mm to 2 mm. The second secondary width may be smaller or equal to a diameter of the microphone inlet, W_OO.

The second secondary height may be in the range of 0.5 mm to 5 mm, 1 mm to 4 mm, 1.5 mm to 4 mm. The second secondary depth may be in the range of 0.5 mm to 5 mm, 1 mm to 3 mm, 1.5 mm to 2 mm.

Compressing the second filter device may be understood as compressing the second filter device in one or more dimensions, e.g. reducing the width, the depth and/or the height of the second filter device. When compressing the second filter device in a dimension, the remaining dimensions may increase and/or decrease. For example, when compressing the second filter device in the width dimension, the height and/or the depth of the second filter device, may be increased and/or reduced.

For example, when compressing the second filter device, the second primary width of the second filter device may altered to the second secondary width, e.g. reduced to insert and fit the second filter device in the through-going opening, the second secondary width being smaller than the second primary width. For example, when compressing the second filter device, the second primary height of the second filter device may altered to the second secondary height, e.g. when the second filter device is compressed in the width dimension, the height of the second filter device may be increased.

For example, when compressing the second filter device, the second primary depth of the second filter device may altered to the second secondary depth, e.g. when the second filter device is compressed in the width dimension, the depth of the second filter device may be increased.

Optionally, the hearing device may comprise a receiver outlet comprising a through-going opening. Optionally, the hearing device may comprise a receiver, such as a loudspeaker, arranged within the housing for outputting audio via the receiver outlet. Optionally, the hearing device may comprise a first filter device comprising a first filter material, the first filter device being arranged at the receiver. Optionally, the hearing device may comprise a second filter device comprising a second filter material, the second filter device being arranged at the wall, wherein optionally the first filter device is arranged between the receiver and the second filter device. In the following whenever referring to microphone, the microphone may be replaced by a receiver, e.g. for outputting one or more first audio outputs.

In one or more exemplary hearing devices, the through-going opening comprises an outer recess in an outer surface of the wall. The outer recess may be located at or in the outer surface of the hearing device. The outer recess may be located at a distal end of the microphone inlet. The second filter device may be arranged in the outer recess or at least partly arranged in the outer recess. In other words, the second filter device may be arranged at a distal end of the microphone inlet. By being arranged in the outer recess or at least partly arranged in the outer recess, the second filter device may for example collect or take up one or more of dirt, dust, earwax, moist, cerumen, and dead skin, before dirt, dust, earwax, moist, cerumen, and dead skin enter the microphone inlet. The solid and/or liquid particles moving along the hearing device, e.g. along the outer surface of the housing of the hearing device, may thereby be stopped before entering the microphone inlet. The second filter device may substantially have a shape corresponding to the shape of the outer recess, such that the second filter device fits substantially in the outer recess. The second filter device may substantially have the shape of a torus, a hollow cylinder, a cylinder, and/or a cube. The second filter device may in other words be an inlay of open cell foam and/or a protective foam inlay, surrounding the microphone inlet.

The second filter device may form or have a central opening, e.g. when shaped as a torus or a hollow cylinder. In one or more example hearing devices, the central opening of the second filter at least partly overlaps, such as overlaps at least 50% of or at least 80% of, the microphone inlet. The central opening of the second filter device may fully overlap the microphone inlet. In other words, the central opening of the second filter device may have a diameter smaller than or equal to a diameter of the microphone inlet, W_OO. The central opening of the second filter device may have a diameter of at least 0.5 mm, such as in the range from 0.5 mm to 5 mm, in the range from 1 mm to 3 mm, or in the range from 1.5 mm to 2 mm. The central opening of the second filter device may have a diameter larger than a diameter of the microphone inlet, W_OO.

In one or more exemplary hearing devices, the through-going opening comprises an outer opening, e.g. having a cross-sectional area smaller than a cross-sectional area of the outer recess. Thereby, the second filter device may, when being arranged in the outer recess, surround or cover the through-going opening of the microphone inlet, and thereby avoid that undesired particles of water and dirt can access the microphone inlet. For example, in a hearing device without second filter device, water droplets may roll along the outer surface of the wall of the hearing device and enter the microphone inlet. By having the second filter device in the outer recess of the wall, these water droplets may be caught by the second filter device, before entering the microphone inlet.

In one or more exemplary hearing devices, the through-going opening comprises an inner recess in an inner surface of the wall. The second filter device may be arranged or at least partly arranged in the inner recess. In other words, the inner recess may be arranged or at least partly arranged in the microphone inlet. By being arranged in the inner recess or at least partly arranged in the inner recess, the second filter device may for example collect or take up one or more of dirt, dust, earwax, moist, cerumen, and dead skin, when dirt, dust, earwax, moist, cerumen, and dead skin enters the microphone inlet. The second filter device may substantially have a shape corresponding to or larger than the shape of the inner recess, such that the second filter device fits, e.g. at least slightly compressed, in the inner recess. The second filter device may substantially have the shape of a cylinder and/or a cube. The housing may comprise a circumferential overhanging wall or inwardly extending flange comprising the outer opening. The outer opening may have a smaller width than the width of the inner recess.

In one or more exemplary hearing devices, the through-going opening comprises an outer opening, e.g. having a cross-sectional area smaller than a cross-sectional area of the inner recess. Thereby, the second filter device may, when being arranged in the inner recess, sit or rest securely in the inner recess. The outer opening of the through-going opening may retain the second filter device in the inner recess, e.g. in the microphone inlet. The second filter device may be compressed when fitted in the inner recess and/or outer recess, e.g. in the microphone inlet. After being fitted or arranged in the inner recess and/or outer recess, the second filter device may be uncompressed or substantially uncompressed, such that the second filter device has a cross-sectional area larger than the cross-sectional are of the outer opening of the through-going opening. The second filter device may, e.g. in a mounted state, exert pressure on the side-walls in the microphone inlet, e.g. in the inner recess and/or in the outer recess. The second filter device may thereby substantially occupy the inner recess, e.g. of the microphone inlet, and thereby avoid that undesired particles of water and dirt can access the microphone inlet and in turn clog and/or damage the first filter device.

In one or more exemplary hearing devices, the second filter material is a compressible foam material. By compressible foam material it may be understood that the second filter material, e.g. the second filter device may be compressed and return to its original shape before being compressed, when uncompressed. The second filter material may for example be a reticulated foam material. Reticulated foam material may be understood as a foam material being very porous, e.g. a low density solid foam. In other words, reticulated foam material may be denoted a foam net material. Further, reticulated foam may be understood as a very open foam with few intact bubbles or cell windows in the foam structure. The second filter material may comprise a 3D structure foam material. An advantage of having a 3D structure foam material may be that particles and liquid droplets may enter the foam while letting sound through. This may prolong the lifetime of the first filter device and in turn of the hearing device. In other words, the second filter device may provide a larger surface area, e.g. a larger effective surface area of filtering than the first filter device. The second filter device, e.g. the second filter material may have a porosity in the range of 80% to 100%, 85% to 98%, and/or 90% to 95%. The second filter device may comprise a second polymer material, such as an organic polymer, e.g. as polyurethane.

In one or more exemplary hearing devices, the second filter device is replaceably arranged in the hearing device via the microphone inlet, e.g. arranged in the microphone inlet or at the receiver outlet. In other words, the second filter device may be replaced by a new second filter device when the second filter device is used up, e.g. when the second filter device is clogged and in turn reduces the performance of the hearing device. The second filter device may be compressed when in a mounted state, and pulled out of the hearing device/microphone inlet, e.g. through the outer opening of the through-going opening.

In one or more exemplary hearing devices, a cross-sectional area of the second filter device in an uncompressed state is larger than one or more of the cross-sectional areas of the inner recess, the outer recess, and the through-going opening of the microphone inlet.

By having the second filter device having a cross-sectional area in an uncompressed state being larger than the cross-sectional areas of the inner recess, the outer recess, and/or the through-going opening, the second filter device may, when being arranged in the inner recess, sit or rest securely in the hearing device. In other words, an outer opening of the through-going opening may retain the second filter device in the inner recess, e.g. in the microphone inlet. The second filter device may be compressed when fitted in the inner recess, the outer recess, and/or the outer opening e.g. in the microphone inlet. After being fitted in the inner recess, the outer recess, and/or the outer opening, the second filter device may be uncompressed, such that the second filter device has a cross-sectional area larger than the cross-sectional area of the outer opening of the through-going opening. The second filter device may, in a mounted state, exert pressure on the side-walls of the inner recess, the outer recess, and/or the outer opening. The second filter device may thereby substantially occupy the inner recess, the outer recess, and/or the outer opening e.g. of the microphone inlet, and thereby avoid that undesired particles of water and dirt can access the microphone inlet and in turn clog the first filter device.

In one or more exemplary hearing devices, the second filter material has a second pore size larger than a first pore size of the first filter material. In other words, the second filter device may be a rougher filter than the first filter device. The second filter device may be configured to act as a pre-filter in the hearing device, e.g. for protecting the first filter device and/or the microphone. For example, the second filter device may be configured to act as a rough filter in the hearing device, e.g. such that the first filter device avoids getting clogged. The second filter device may for example collect or catch larger particles that would block or clog the first filter device otherwise.

The first filter device may be configured to act as a post-filter in the hearing device. For example, the first filter device may be configured to act as a fine filter in the hearing device, e.g. finer than the second filter device, such that the first filter device blocks, captures, or collects finer particles than the second filter device. The first filter device may for example collect or catch smaller particles that would block, clog, or damage the microphone.

In one or more exemplary hearing devices, the second filter material has a second pore size in the range of 50 pores per inch, PPI, to 250 PPI. The first filter material optionally has a first pore size in the range of 400 PPI to 2000 PPI. The second pore size may for example be 80 PPI, 100 PPI, 120 PPI, 150 PPI, and/or 200 PPI. The first pore size may for example be 600 PPI, 900 PPI, 1300 PPI, and/or 1800 PPI.

In other words, the second filter device may be a rougher filter than the first filter device. The second filter device may have a smaller pore density than the first filter device. The average pore size of the second filter device may be larger than the average pore size of the first filter material. The average pore size of the second filter device may be in the range of 50 μm to 300 μm. The average pore size of the first filter device may be in the range of 6 μm to 40 μm. The second filter device may be configured to act as a pre-filter in the hearing device. For example, the second filter device may be configured to act as a rough filter in the hearing device, e.g. such that the first filter device avoids getting clogged. The second filter device may for example collect or catch larger particles that would block or clog the first filter device otherwise. The second pore size may be indicative of a second pore density in the second filter material. The second filter device may therefore block, capture, or collect particles down to a second particle size. The second particle size may for example be larger than 50 μm, larger than 100 μm, larger than 200 μm, larger 300 μm, and/or larger than 500 μm.

The first filter device may be configured to act as a post-filter in the hearing device. For example, the first filter device may be configured to act as a fine filter in the hearing device, e.g. such that the first filter device blocks, captures, or collects finer particles than the second filter device. The first filter device may for example collect or catch smaller particles that would block, clog, or damage the microphone. The first pore size may be indicative of a first pore density in the first filter material. The first filter device may therefore block, capture, or collect particles down to a first particle size, e.g. smaller than the second particle size. The first particle size may for example be larger than 6 μm, larger than 10 μm, larger than 15 μm, larger 20 μm, and/or larger than 30 μm.

In one or more exemplary hearing devices, the second filter material is hydrophilic or hydrophobic. For example, when the second filter device is arranged in the outer recess or at least partly arranged in the outer recess, e.g. at the outer surface of the wall, it may be advantageous that the second filter material is hydrophilic, e.g. to absorb or collect water droplets or moist that would otherwise enter the microphone inlet. The hearing device may, in use, have a temperature substantially equal to human body temperature. The moisture and/or liquid droplets that have been collected by the second filter device, may then evaporate gradually, e.g. in dryer wearing periods.

For example, when the second filter device is arranged in the inner recess or at least partly arranged in the inner recess, it may be advantageous that the second filter material is hydrophobic, e.g. to repel water droplets or moist that would otherwise enter the microphone inlet.

A method of mounting a filter device on a hearing device is disclosed. The hearing device comprises a housing comprising a wall, a microphone inlet, a microphone arranged within the housing for receiving audio via the microphone inlet, and a first filter device.

The method comprises compressing a second filter device.

The method comprises inserting the compressed second filter device in the housing via the microphone inlet, e.g. such that the second filter device is arranged at the wall of the hearing device. Inserting the compressed second filter device in the housing via the microphone inlet may comprise keeping the second filter device compressed while inserting the compressed second filter device in the housing. In a mounted state of the second filter device, the first filter device is arranged between the microphone and the second filter device.

In one or more exemplary hearing devices and/or methods, inserting the compressed second filter device via the microphone inlet may comprise inserting the compressed second filter device via a through-going opening of the microphone inlet.

In one or more exemplary hearing devices and/or methods, the method comprises arranging the second filter device in an outer recess of the through-going opening in an outer surface of the wall.

In one or more exemplary hearing devices and/or methods, the method comprises arranging the second filter device in an inner recess of the through-going opening in an inner surface of the wall.

In one or more exemplary hearing devices and/or methods, the method comprises replacing the second filter device. In one or more exemplary hearing devices and/or methods, replacing the second filter device comprises removing a used second filter device from the hearing device, e.g. by compressing the used second filter device and pulling the used second filter device out of the hearing device, e.g. out of the through-going opening. In one or more exemplary hearing devices and/or methods, replacing the second filter device comprises compressing a new second filter device, and inserting the compressed new second filter device in the housing of the hearing device via the microphone inlet, e.g. via or in the through-going opening. By having a second filter device, e.g. that is replaceable, an advantage is that the first filter device may not need to be replaced. Further, the present method allows filter exchange without disassembly of the hearing device. The filter exchange may be done via the microphone inlet.

It is to be understood that a description of a feature in relation to a hearing device/audio device is also applicable to the corresponding feature in method(s). Also, it is to be understood, that the method described herein can be a method of mounting a filter device on a hearing device, wherein the hearing device is a hearing device as disclosed herein.

FIG. 1A shows a cross-sectional view of a known or prior art hearing device. The hearing device 2A shown in FIG. 1A is shown without a second filter device (not shown in FIG. 1A, but later having ref number 50). The hearing device 2A comprises a housing 4 comprising a wall 10. The wall 10 may be located at the distal surface or distal side of the hearing device 2A, e.g. an outer surface of the wall may face away from the user of the hearing device when in use and/or towards an exterior of the hearing device.

The hearing device 2A comprises a microphone inlet 20 comprising a through-going opening 22 e.g. in the wall 10 of the housing 4. In other words, the hearing device 2A comprises through-going opening 22 comprising an outer opening 6 formed in the housing 4, e.g. in the wall 10, at a first end of the microphone inlet 20. The hearing device 2A comprises a microphone 30 arranged within the housing 4 for receiving audio via the microphone inlet 20. The hearing device 2A comprises a first filter device 40 comprising a first filter material being a polyester foam material, e.g. a polyester monofilament foam material such as a HD15 foam filter having an average pore size of 15 μm. The first filter device 40 is arranged at the microphone 30. As may be seen in FIG. 1A a particle 3 (the size of the particle 3 is for illustrative purposes not shown to scale), such as a water droplet, may roll along an outer surface 12 of the wall of the hearing device 2A and enter the microphone inlet 20.

The first filter device 40 being arranged at the microphone 30 may be understood as the first filter device 40 being closer to the microphone 30 than the second filter device (not shown). The first filter device 40 being arranged at the microphone 30 may be understood as being arranged at a distance to the microphone 30, i.e. not in contact with the microphone 30, not shown in FIG. 1A, but shown in FIG. 4 and FIG. 5. The first filter device 40 being arranged at the microphone may optionally be understood as being arranged on the microphone 30, i.e. in contact with the microphone 30, as may be seen in FIG. 1A.

Figure 1B:
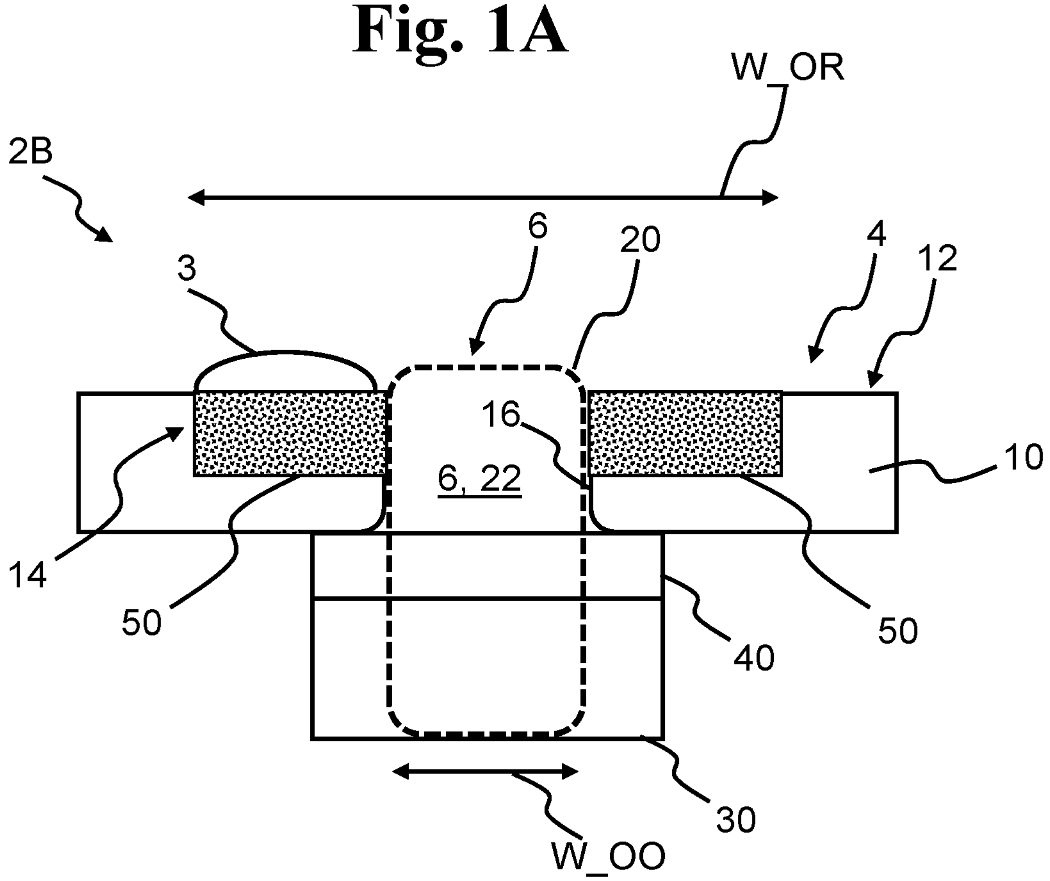
FIG. 1B shows a cross-sectional view of an exemplary hearing device according to this disclosure.

FIG. 1B shows a cross-sectional view of an exemplary hearing device as described herein. FIG. 1B shows a hearing device 2B as in FIG. 1A, but in FIG. 1B the hearing device 2B comprises in addition a second filter device 50.

The second filter device 50 comprises a second filter material being a reticulated foam material having an average pore size of 150 μm.

The second filter device 50 is arranged at the wall 10 and the first filter device is arranged between the microphone 30 and the second filter device 50.

The second filter device 50 is configured to act as a pre-filter in the hearing device 2B, e.g. in the microphone inlet 20. For example, the second filter device 50 is configured to act as a rough filter in the hearing device 2B, e.g. such that the first filter device 40 avoids getting clogged. The second filter device 50 is configured to collect one or more of dirt, dust, earwax, water, moist, sweat, cerumen, and dead skin, such as the particle 3 (the size of the particle 3 is for illustrative purposes not shown to scale). By having the first filter device 40 arranged between the second filter device 50 and the microphone 30, the first filter device 40 may have a longer durability or lifetime before being clogged and reducing the performance of the hearing device 2B, e.g. blocking for audio or partly for audio in the microphone inlet 20, such that the audio received by the microphone 30 is reduced.

By second filter device 50 arranged at the wall 10 it may be understood that the second filter device 50 is closer to the wall 10 than the first filter device 40. In FIG. 1B the second filter device 50 is arranged in the wall 10 of the hearing device 2B.

Optionally, the second filter device 50 may be arranged at a distance from the wall 10, e.g. in the microphone inlet 20, such as in an inner recess (not shown in FIG. 1B, but later having ref number 18).

In FIG. 1B, the through-going opening 22 comprises an outer recess 14 in an outer surface 12 of the wall 10. The second filter device 50 is arranged in the outer recess 14. The outer recess 14 is located at the outer surface of the hearing device 2. In other words, the outer recess 14 is located at a distal end of the microphone inlet 20. The second filter device 50 is arranged in the outer recess 14 or at least partly arranged in the outer recess 14. By being arranged in the outer recess 14 or at least partly arranged in the outer recess 14, the second filter device 50 may for example collect one or more of dirt, dust, earwax, moist, cerumen, and dead skin, before it enters the microphone inlet, such as the particle 3. In FIG. 1B, the second filter device 50 is arranged in the outer recess 14 or at least partly arranged in the outer recess 14, e.g. at the outer surface of the wall 10. The second filter material is preferably hydrophilic such that water droplets are collected or absorbed by the second filter device 50, thus preventing water droplets or moist from entering the microphone inlet. The hearing device 2B may, in use, have a temperature substantially equal to human body temperature.

The moisture and/or liquid droplets that have been collected by the second filter device 50, may then evaporate gradually, e.g. in dryer wearing periods.

The second filter device 50 may substantially have a shape corresponding to the shape of the outer recess 14, such that the second filter device 50 fits substantially in the outer recess 14. As may be seen in FIG. 2, the second filter device 50 may substantially have the shape of a torus, a hollow cylinder, a cylinder, and/or a cube.

In one or more exemplary hearing devices, the through-going opening 22 comprises an outer opening 6 having a cross-sectional area smaller than a cross-sectional area of the outer recess 14, e.g. an outer opening width W_OO being smaller than an outer recess width W_OR. By having the through-going opening 22 comprising an outer opening 6 having a cross-sectional area smaller than a cross-sectional area of the outer recess 14, the second filter device 50 may, when being arranged in the outer recess 14, surround the through-going opening 22 of the microphone inlet 20, and thereby avoid that undesired particles of water and dirt can access the microphone inlet 20. For example, water droplets may roll along the outer surface 12 of the wall 10 of the hearing device 2B and enter the microphone inlet 20. By having the second filter 50 in the outer recess 14 of the wall 10, these water droplets may be caught by the second filter device 50, before entering the microphone inlet 20.

Figure 2:
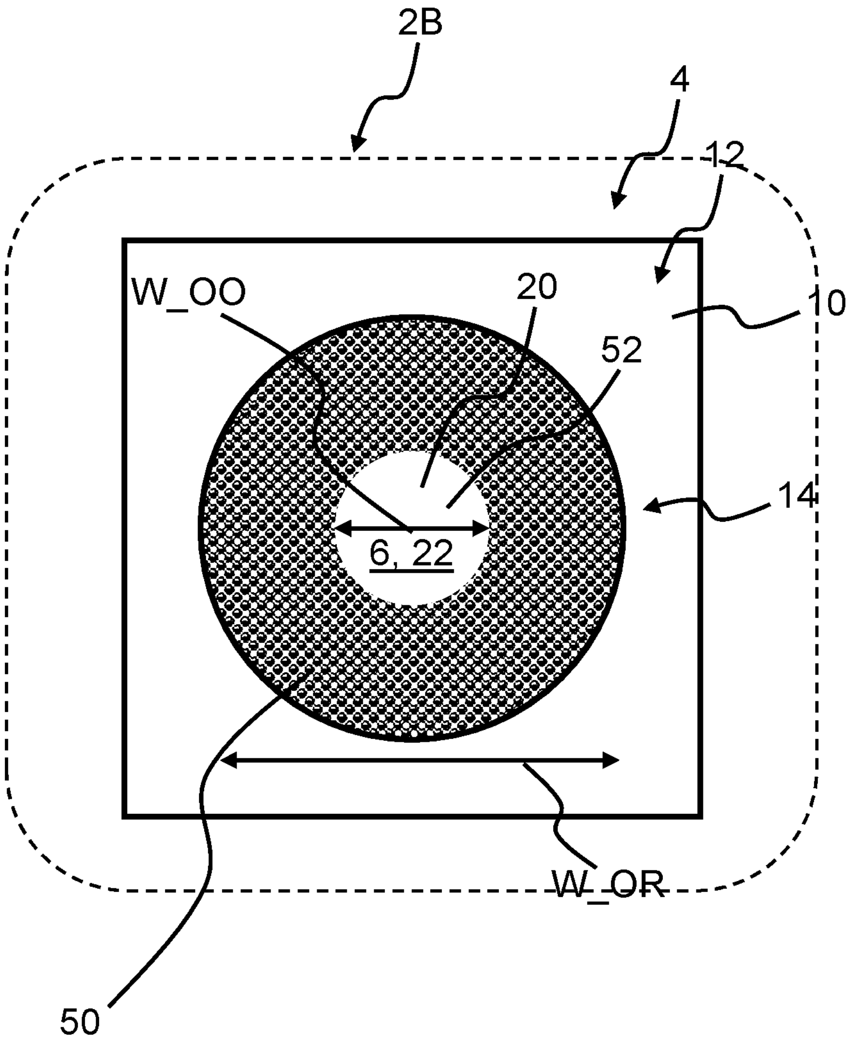
FIG. 2 shows an outer side view of an exemplary hearing device according to this disclosure.

FIG. 2 shows an outer side view of an exemplary hearing device as described herein. FIG. 2 shows a hearing device 2B as in FIG. 1B seen from the distal side, i.e. a top view. The distal surface of the hearing device 2B is seen from above, e.g. the outer surface 12 of the wall 10 is seen from the distal side. The microphone inlet 20 and the through-going opening 22 are seen from the distal side. The second filter device 50 may substantially have a shape corresponding to the shape of the outer recess 14, such that the second filter device 50 fits substantially in the outer recess 14. The second filter device 50 may substantially have the shape of a torus, a hollow cylinder, a cylinder, and/or a cube. In the example hearing device of FIG. 2, the second filter device 50 has substantially the shape of a hollow cylinder or a torus and has a central opening 52. The outer opening width W_OO (in FIG. 2 corresponding to the diameter of the central opening 52) is smaller than the outer recess width W_OR. The outer opening width W_OO and/or the diameter of the central opening 52 may be in the range of 0.2 mm to 5 mm, 0.5 mm to 3 mm, 0.5 mm to 2 mm. The outer recess width W_OR may be in the range of 0.5 mm to 15 mm, 1 mm to 10 mm, 1.5 mm to 8 mm.

Figure 3:
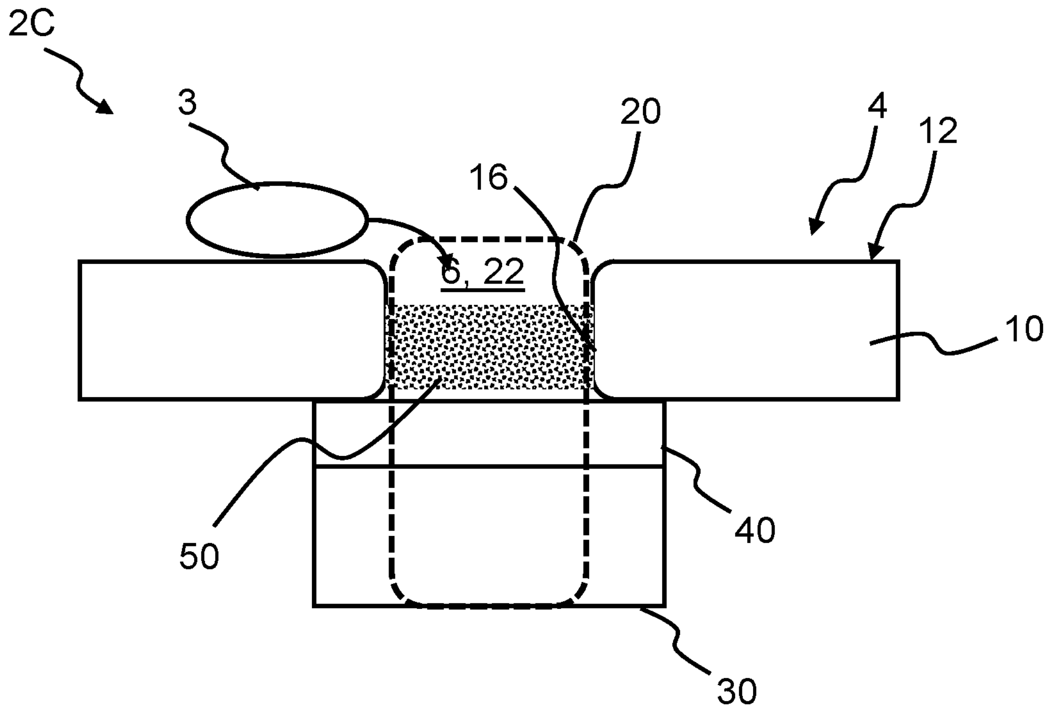
FIG. 3 shows a cross-sectional view of an exemplary hearing device according to this disclosure.

FIG. 3 shows a cross-sectional view of an exemplary hearing device as described herein. FIG. 3 shows a hearing device 2C as in FIGS. 1A-2, but where the second filter device 50 is arranged at an inner surface 16 of the wall 10, e.g. inside or partly inside the through-going opening 22. The second filter device 50 is compressed against the inner surface 16 of the inner walls of the through-going opening 22. The second filter device 50 is therefore held in place by the compression forces exerted on each other by the inner surface 16 and the second filter device 50. The second filter material has elastic foam properties allowing the second filter device 50 to be compressed in the microphone inlet 20. The second filter device 50 is configured to act as a pre-filter in the hearing device 2C, e.g. in the microphone inlet 20. For example, the second filter device 50 is configured to act as a rough filter in the hearing device 2C, e.g. such that the first filter device 40 avoids getting clogged. The second filter device 50 is configured to collect one or more of dirt, dust, earwax, water, moist, sweat, cerumen, and dead skin. In other words, the second filter device 50 may be configured to stop particles or liquid with high viscosity from landing on the first filter device, e.g. particles with a viscosity in the range from 1 Pa·s to 10000 Pa·s. By having the first filter device arranged between the second filter device 50 and the microphone 30, the first filter device 40 has a longer durability or lifetime before being clogged and reducing the performance of the hearing device 2C, e.g. blocking for audio or partly for audio in the microphone inlet 20, such that the audio received by the microphone 30 is reduced.

Figure 4:
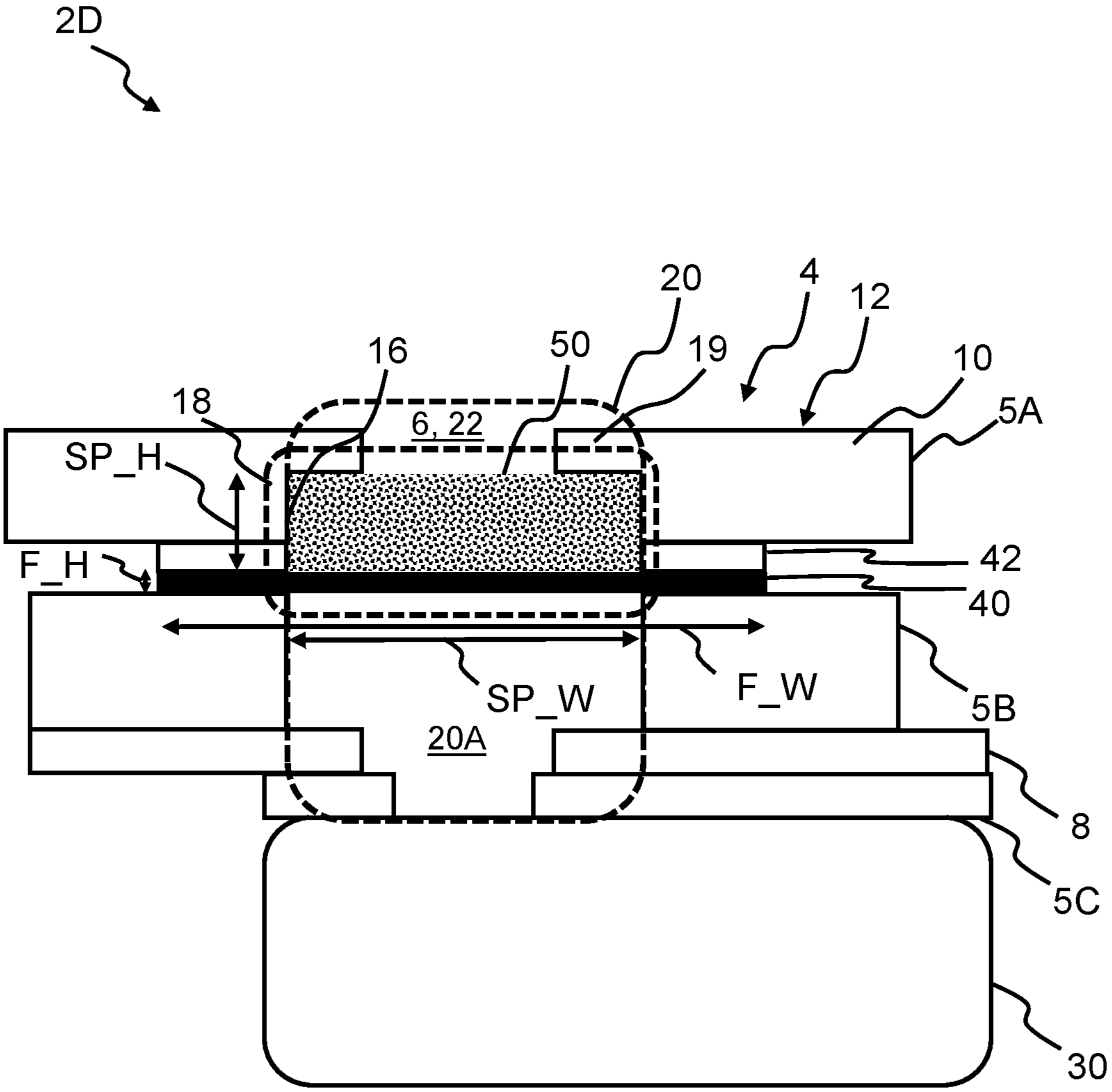
FIG. 4 shows a cross-sectional view of an exemplary hearing device according to this disclosure.

FIG. 4 shows a cross-sectional view of an exemplary hearing device as described herein. FIG. 4 shows a hearing device 2D as in FIGS. 1A-3, but where the through-going opening 20 comprises an inner recess 18 in an inner surface 16 of the wall 10. The second filter device 50 is arranged or at least partly arranged in the inner recess 18. In other words, the inner recess 18 is arranged or at least partly arranged in the microphone inlet 20. The inner recess 18 has a width in the range of 0.5 mm to 5 mm, 1 mm to 3 mm, 1.5 mm to 2 mm, a height in the range of 0.5 mm to 5 mm, 1 mm to 3 mm, 1.5 mm to 2 mm, and a depth in the range of 0.5 mm to 5 mm, 1 mm to 3 mm, 1.5 mm to 2 mm. By being arranged in the inner recess 18 or at least partly arranged in the inner recess 18, the second filter device 50 may for example collect one or more of dirt, dust, earwax, moist, cerumen, and dead skin, when it enters the microphone inlet. The second filter device 50 has substantially a shape corresponding to the shape of the inner recess 18, such that the second filter device 50 fits substantially in the inner recess 18. The second filter device 50 may substantially have the shape of a cylinder and/or a cube. The housing 4 may comprise a circumferential overhanging wall 19 comprising the outer opening 6. The outer opening 6 may have a smaller width than the width of the inner recess 18. The hearing device 2D comprises a circuit board 8, e.g. arranged between the first filter device 40 and the microphone 30. In FIG. 4 the second filter material is optionally hydrophobic, such that water droplets are repelled from the through going opening.

For example, when the second filter device 50 is arranged in the inner recess 18 or at least partly arranged in the inner recess 18, it may be advantageous that the second filter material is hydrophobic, e.g. to repel water droplets or moist that would otherwise enter the microphone inlet 20. The first filter device 40 may comprise a first attachment device 42, e.g. as one or more adhesive portions. The first filter device 40 may, in a mounted state, have a first height F_H, a first width F_W, and a first depth (not shown).

The through-going opening 22 comprises an outer opening 6 having a cross-sectional area smaller than a cross-sectional area of the inner recess 18. By having the through-going opening 22 comprising an outer opening 6 having a cross-sectional area smaller than a cross-sectional area of the inner recess 18, the second filter device 50 sits securely in the inner recess 18, when being arranged in the inner recess 18, e.g. avoiding that the second filter device 50 falls out of the hearing device 2D. This may be advantageous when the width of the second filter device 50 in an uncompressed state is smaller than the width of the microphone inlet 20 or the inner recess 18, since the second filter device 50 does not exert pressure on the inner surface 16 of the inner walls. The outer opening 6 of the through-going opening 22 may retain the second filter device 50 in the inner recess 18, e.g. in the microphone inlet 20.

In one or more hearing devices, the second filter device 50 may be compressed when fitted in the inner recess 18, e.g. in the microphone inlet 20. When fitted in the inner recess 18, the second filter device 50 may be uncompressed, such that the second filter device 50 has a cross-sectional area larger than the cross-sectional area of the outer opening 6 of the through-going opening 22. The second filter device 50 may, in a mounted state, exert pressure on the inner surface 16, e.g. the side-walls or inner walls in the microphone inlet 20, e.g. in the inner recess 18. The second filter device 50 may thereby substantially occupy the inner recess 18, e.g. of the microphone inlet 20, and thereby avoid that undesired particles of water and dirt can access the microphone inlet 20 and in turn clog the first filter device 40.

In FIG. 4, the second filter device 50 is at least partly arranged between a middle part 5B and a distal part 5A of the housing 4, e.g. the distal part 5A of the housing 4 and the middle part 5B of the housing 4 forming a hollow space for arranging the second filter device 50 and/or the first filter device 40. The hearing device 2D comprises a proximal part 20A of the microphone inlet 20, e.g. for guiding the audio to the microphone 30.

The second filter device 50 has, in a mounted state, e.g. an uncompressed state, have a second primary height SP_H, a second primary width SP_W, and a second primary depth (not shown). The second primary width may be in the range of 0.5 mm to 5 mm, 1 mm to 3 mm, 1.5 mm to 2 mm.

The second primary height may be in the range of 0.5 mm to 5 mm, 1 mm to 3 mm, 1.5 mm to 2 mm. The second primary depth may be in the range of 0.5 mm to 5 mm, 1 mm to 3 mm, 1.5 mm to 2 mm.

The second filter device 50 may, in an compressed state, have a second secondary height (not shown, but later having ref number SS_H, e.g. in FIG. 6A-6C), a second secondary width (not shown, but later having ref number SS_H, e.g. in FIG. 6A-6C), and a second secondary depth (not shown). The second secondary width may be in the range of 0.5 mm to 5 mm, 0.5 mm to 3 mm, 0.9 mm to 2 mm.

The second secondary height may be in the range of 0.5 mm to 5 mm, 1 mm to 4 mm, 1.5 mm to 4 mm. The second secondary depth may be in the range of 0.5 mm to 5 mm, 1 mm to 3 mm, 1.5 mm to 2 mm.

The second filter device 50 is a rougher filter than the first filter device 40. The second filter device 50 has a smaller pore density than the first filter device 40. The second filter device 50 is configured to act as a pre-filter in the hearing device 2D. For example, the second filter device 50 may be configured to act as a rough filter in the hearing device 2D, e.g. such that the first filter device 40 avoids getting clogged. The second filter device 50 may for example collect or catch larger particles that would block or clog the first filter device 40 otherwise. The second pore size may be indicative of a second pore density in the second filter material. The second filter device 50 may therefore block, capture, or collect particles down to a second size particle size.

The first filter device 40 is configured to act as a post-filter in the hearing device 2D. For example, the first filter device 40 is configured to act as a fine filter in the hearing device 2D, e.g. such that the first filter device blocks, captures, or collects finer particles than the second filter device 50. The first filter device 40 may for example collect or catch smaller particles that would block, clog, or damage the microphone 30. The first pore size may be indicative of a first pore density in the first filter material. The first filter device 40 may therefore block, capture, or collect particles down to a first size particle size, e.g. smaller than the second particles size.

Figure 5:
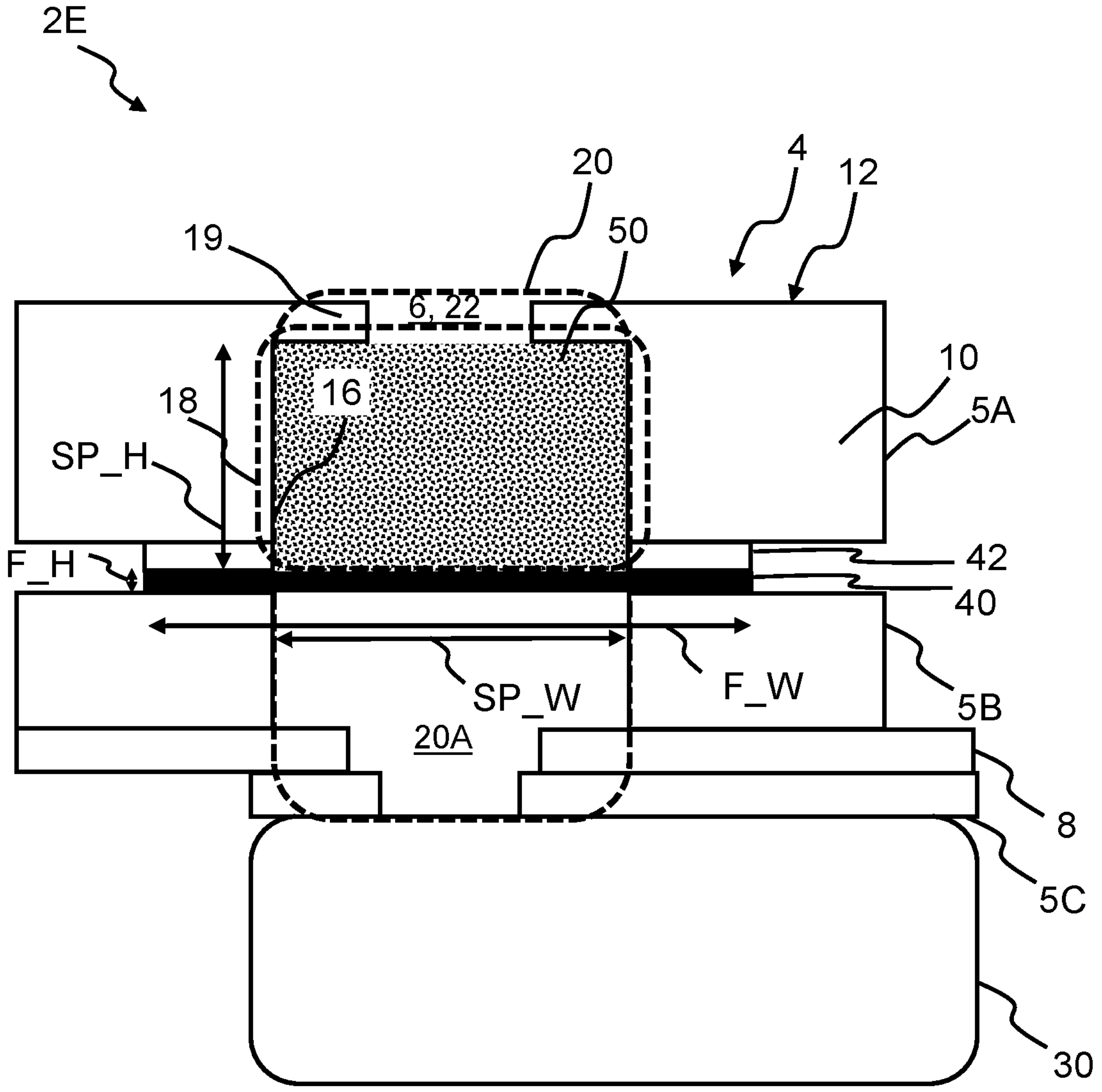
FIG. 5 shows a cross-sectional view of an exemplary hearing device according to this disclosure.

FIG. 5 shows a hearing device 2E as in FIG. 4, but where the through-going opening 20 comprises an inner recess 18 in an inner surface 16 of the wall 10 with different dimensions. As may be seen in FIG. 5 the inner recess 18 has a larger height than in FIG. 4. The second filter device 50 may therefore have a larger second primary height SP_H. By having a second filter device 50 with a larger second primary height SP_H, the second filter device may be effective for a longer time, and may therefore be exchanged less often. By having a larger second primary height SP_H, the second filter device 50 may have more surface area for collecting or capturing particles.

A hearing device comprising both a distal second filter, i.e. a second filter of the embodiments shown in FIGS. 1B and/or 2, arranged in an outer recess 14 and a proximal second filter, i.e. a second filter of the embodiments shown in FIG. 3, 4, or 5, arranged in the microphone inlet 20 is envisaged. The distal and proximal second filters may be monolithic.

Figure 6A:
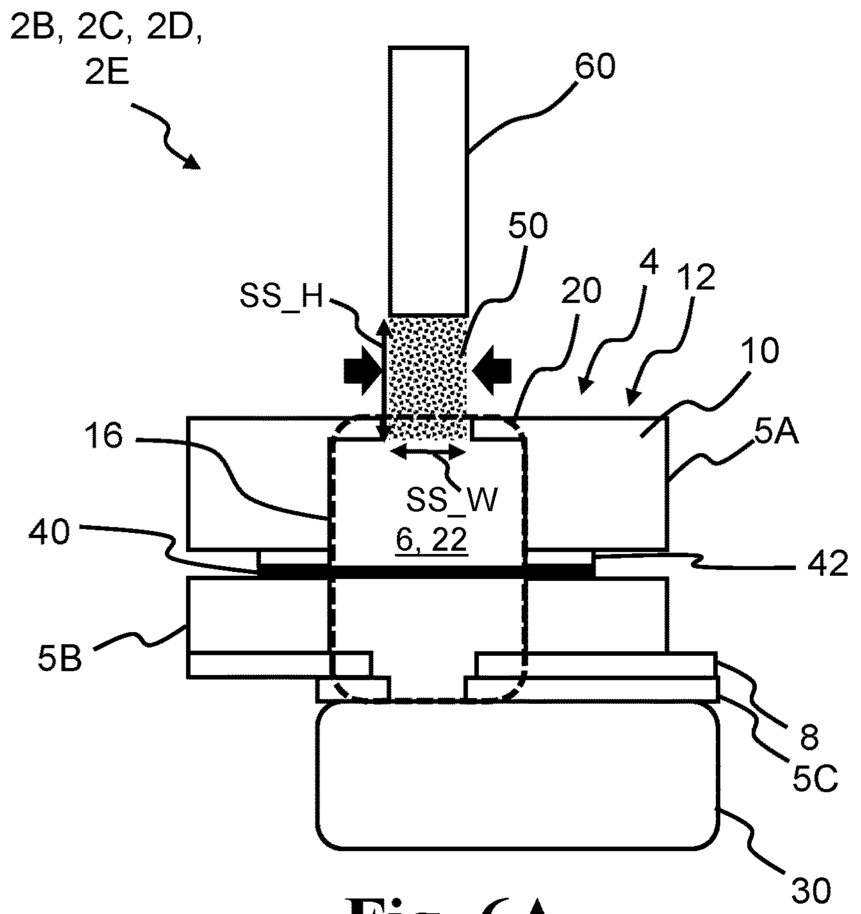
FIGS. 6A-C show cross-sectional views of an exemplary hearing device according to this disclosure, and an exemplary illustration of carrying out a method according to this disclosure.
Figure 6B:
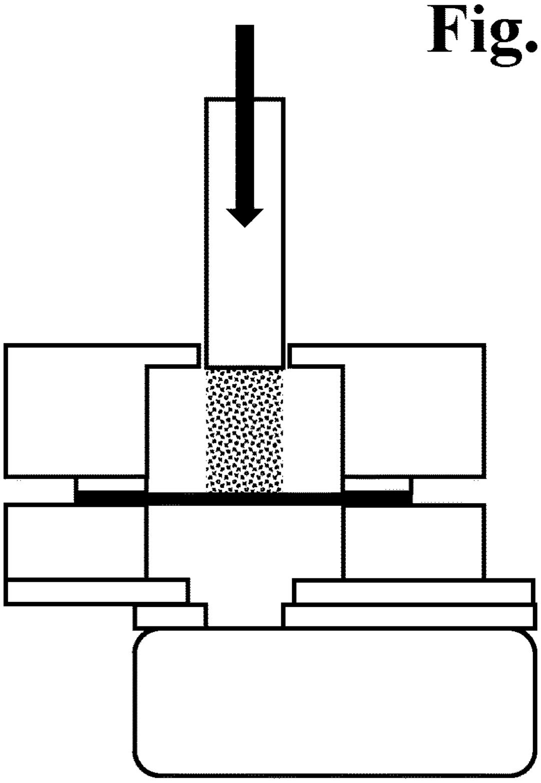
Figure 6C:
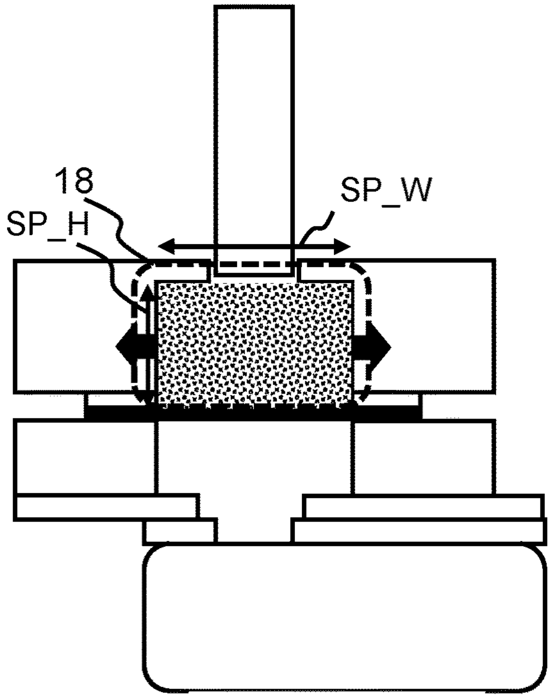

FIGS. 6A-C show cross-sectional views of exemplary hearing devices, such as hearing device 2B, 2C, 2D, 2E as described herein. Further, FIGS. 6A-C show an exemplary illustration of carrying out a method as described herein, such as a method of mounting a filter device, e.g. a second filter device 50, on or in a hearing device 2B, 2C, 2D, 2E disclosed herein. The hearing device 2B, 2C, 2D, 2E comprises a housing 4 comprising a wall 10, a microphone inlet 20, a microphone 30 arranged within the housing 4 for receiving audio via the microphone inlet 20, and a first filter device 40.

The method comprises compressing a second filter device 50 as may be seen in FIG. 6A. The second filter device 50 may be compressed via a filter device tool 60. The second filter device 50 may here have a second secondary width SS_W in a compressed state. The second filter device 50 may here have a second secondary height SS_H in a compressed state.

The method comprises inserting the compressed second filter device 50 in the housing 4 via the microphone inlet 20, e.g. such that the second filter device 50 is arranged at the wall 10 of the hearing device 2, as may be seen in FIG. 6B. Inserting the compressed second filter device 50 in the housing 4 via the microphone inlet 20 may comprise keeping the second filter device 50 compressed while inserting the compressed second filter device 50 in the housing 4, as may be seen in FIG. 6B. In a mounted state of the second filter device 50, the first filter device 40 is arranged between the microphone 30 and the second filter device 50. Compressing the second filter device 50 may be understood as compressing the second filter device 50 in one or more dimensions, e.g. reducing the width, the depth and/or the height of the second filter device 50. When compressing the second filter device 50 in a dimension, the remaining dimensions may increase and/or decrease. For example, when compressing the second filter device 50 in the width dimension, the height and/or the depth of the second filter device, may be increased and/or reduced.

For example, when compressing the second filter device 50, the second primary width SP_W of the second filter device 50 may altered to the second secondary width SS_W, e.g. reduced to fit the second filter device 50 in the through-going opening 22, the second secondary width SS_W being smaller than the second primary width SP_W. For example, when compressing the second filter device 50, the second primary height SP_H of the second filter device 50 may altered to the second secondary height SS_H, e.g. when the second filter device 50 is compressed in the width dimension, the height of the second filter device 50 may be increased.

For example, when compressing the second filter device 50, the second primary depth of the second filter device may altered to the second secondary depth, e.g. when the second filter device is compressed in the width dimension, the depth of the second filter device may be increased.

Inserting the compressed second filter device 50 in the housing 4 via the microphone inlet 20 may comprise releasing the pressure on the second filter device 50, such that the second filter device 50 is substantially in an uncompressed state, when arranged in the hearing device 2B, 2C, 2D, 2E, as may be seen in FIG. 6C. The second filter device 50 may, in a mounted state, e.g. an uncompressed state, have a second primary height SP_H, a second primary width SP_W, and a second primary depth (not shown).

Optionally, the method comprises arranging the second filter device 50 in an inner recess 18 of the through-going opening 22 in an inner surface 16 of the wall, as shown in FIGS. 6B-6C.

Figure 7:
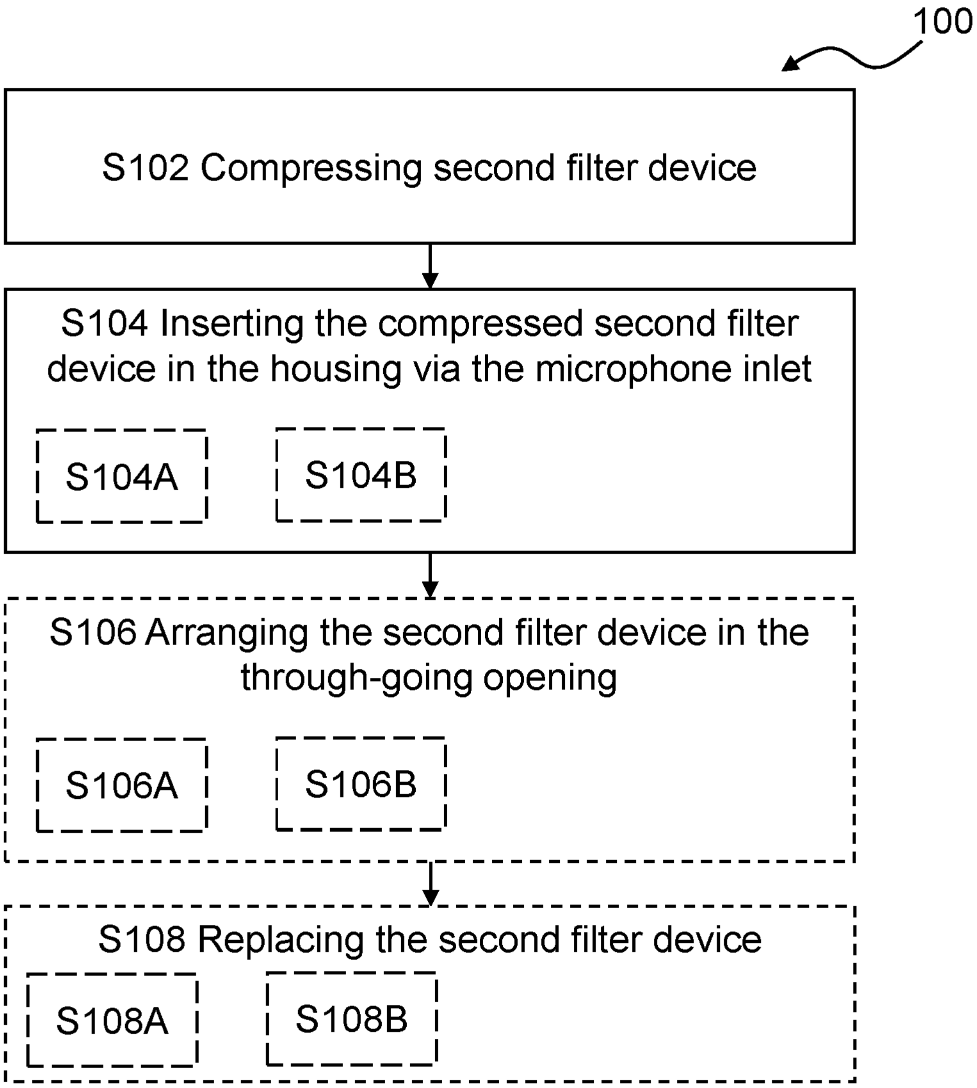
FIG. 7 is a flow diagram of an exemplary method according to this disclosure.

FIG. 7 is a flow diagram of an exemplary method as described herein.

A method 100 of mounting a filter device on a hearing device is disclosed.

The hearing device comprises a housing comprising a wall, a microphone inlet, a microphone arranged within the housing for receiving audio via the microphone inlet, and a first filter device.

The method 100 comprises compressing S102 a second filter device.

The method 100 comprises inserting S104 the compressed second filter device in the housing via the microphone inlet, e.g. such that the second filter device is arranged at the wall of the hearing device. Inserting S104 the compressed second filter device in the housing via the microphone inlet may comprise keeping S104A the second filter device compressed while inserting the compressed second filter device in the housing. Inserting S104 the compressed second filter device in the housing via the microphone inlet may comprise releasing the pressure on the second filter device, such that the second filter device is substantially in an uncompressed state, when arranged in the hearing device. In a mounted state of the second filter device, the first filter device is arranged between the microphone and the second filter device.

In one or more exemplary methods, inserting S104 the compressed second filter device via the microphone inlet may comprise inserting S104B the compressed second filter device via a through-going opening of the microphone inlet.

In one or more exemplary methods, the method comprises arranging S106 the second filter device in the through-going opening.

In one or more exemplary methods, arranging S106 the second filter device in the through-going opening may comprise arranging S106A the second filter device in an outer recess of the through-going opening in an outer surface of the wall.

In one or more exemplary methods, arranging S106 the second filter device in the through-going opening may comprise arranging S106B the second filter device in an inner recess of the through-going opening in an inner surface of the wall.

In one or more exemplary methods, the method comprises replacing S108 the second filter device. Replacing S108 the second filter device optionally comprises removing S108A a used second filter device from the hearing device, e.g. by compressing the used second filter device and pulling the used second filter device out of the hearing device, e.g. out of the through-going opening. In one or more exemplary methods, replacing S108 the second filter device comprises compressing S108B a new second filter device, and inserting the compressed new second filter device in the housing of the hearing device via the microphone inlet, e.g. via or in the through-going opening.

Also disclosed are hearing devices and methods according to any of the following items.

Item 1. A hearing device comprising
- a housing comprising a wall,
- a microphone inlet comprising a through-going opening;
- a microphone arranged within the housing for receiving audio via the microphone inlet;
- a first filter device comprising a first filter material, the first filter device being arranged at the microphone; and
- a second filter device comprising a second filter material.

Item 2. Hearing device according to item 1, wherein the through-going opening comprises an outer recess in an outer surface of the wall, wherein the second filter device is arranged in the outer recess.

Item 3. Hearing device according to any of items 1-2, wherein the through-going opening comprises an inner recess in an inner surface of the wall, wherein the second filter device is arranged in the inner recess.

Item 4. Hearing device according to any of items 1-3, wherein the second filter material is a compressible foam material.

Item 5. Hearing device according to any of items 1-4, wherein the second filter device is replaceably arranged in the hearing device via the microphone inlet.

Item 6. Hearing device according to any of items 1-5, wherein a cross-sectional area of the second filter device in an uncompressed state is larger than one or more of the cross-sectional areas of the inner recess, the outer recess, and the through going opening of the microphone inlet.

Item 7. Hearing device according to any of items 1-6, wherein the second filter material has a second pore size larger than a first pore size of the first filter material, Item 8. Hearing device according to any of items 1-7, wherein the second filter material has a second pore size in the range of 50 pores per inch, PPI, to 250 pores per inch, PPI, and/or the first filter material has a first pore size in the range of 400 pores per inch, PPI, to 2000 pores per inch, PPI.

Item 9. Hearing device according to any of items 1-8, wherein the second filter material is hydrophilic or hydrophobic.

Item 10. Hearing device according to any of items 1-9, wherein the second filter device substantially has or has the shape of a torus.

Item 11. Hearing device according to any of items 1-10, wherein the second filter device substantially has or has the shape of a hollow cylinder.

Item 12. Hearing device according to any of items 1-11, wherein the second filter device substantially has or has the shape of a cylinder.

Item 13. Hearing device according to any of items 1-12, wherein the second filter device substantially has or has the shape of a cube.

Item 14. Hearing device according to any of items 1-13, wherein the second filter device has a central opening Item 15. Hearing device according to item 14, wherein the central opening at least partly overlaps, such as overlaps at least 50% of or at least 80% of, the microphone inlet.

Item 16. Hearing device according to item 14, wherein the central opening fully overlaps the microphone inlet.

Item 17. Hearing device according to any of items 1-16, the second filter device being arranged at the wall, and wherein the first filter device is arranged between the microphone and the second filter device.

Item 18. Method of mounting a filter device on a hearing device comprising a housing comprising a wall, a microphone inlet, a microphone arranged within the housing for receiving audio via the microphone inlet, and a first filter device, the method comprising:
compressing a second filter device; and
inserting the compressed second filter device in the housing via the microphone inlet.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-7 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

2A, 2B, 2C, 2D, 2E hearing device
3 particle
4 housing
5A distal part
5B middle part
5C proximal part
6 outer opening
8 circuit board
10 wall
12 outer surface
14 outer recess
16 inner surface
18 inner recess
19 overhanging wall
20 microphone inlet
20A proximal part
22 through going opening
30 microphone
40 first filter device
42 first attachment device
50 second filter device
52 central opening
60 filter device tool
W_OO outer opening width
W_OR outer recess width
F_H first height
F_W first width
SP_H second primary height
SP_W second primary width
SS_H second secondary height
SS_W second secondary width
S102 compressing a second filter device
S104 inserting the compressed second filter device in the housing via the microphone inlet
S104A keeping the second filter device compressed while inserting the compressed second filter device in the housing
S104B inserting the compressed second filter device via a through-going opening of the microphone inlet
S106 arranging the second filter device in the through-going opening
S106A arranging the second filter device in an outer recess of the through-going opening in an outer surface of the wall
S016B arranging the second filter device in an inner recess of the through-going opening in an inner surface of the wall S108 replacing the second filter device S108A removing a used second filter device from the hearing device S108B compressing a new second filter device, and inserting the compressed new second filter device in the housing of the hearing device via the microphone inlet

The invention claimed is:

1. A hearing device comprising:

a housing comprising a wall;

a microphone inlet;

a microphone accommodated by the housing, the microphone configured to receive audio via the microphone inlet;

a first filter device comprising a first filter material; and a second filter device, the second filter device comprising a second filter material, wherein the first filter device is between the microphone and the second filter material of the second filter device;

wherein the wall of the housing comprises an inner recess, and wherein the second filter device is at least partially in the inner recess.

2. The hearing device according to claim 1, wherein the wall of the housing also comprises an outer opening.

3. The hearing device according to claim 2, wherein a width of the inner recess is larger than a cross-sectional width of the outer opening at the wall of the housing.

4. The hearing device according to claim 2, wherein the outer opening at the wall of the housing is in fluid communication with the inner recess.

5. The hearing device according to claim 2, wherein the wall of the housing has a first side and a second side opposite from the first side, wherein the outer opening is closer to the first side than the second side, and wherein the recess is closer to the second side than the first side.

6. The hearing device according to claim 2, wherein the outer opening at the wall of the housing extends to, or is a part of, the microphone inlet.

7. The hearing device according to claim 1, wherein the second filter material is a compressible foam material.

8. The hearing device according to claim 1, wherein the second filter device is replaceably arranged in the hearing device via the microphone inlet.

9. The hearing device according to claim 1, wherein a cross-sectional area of the second filter device in an uncompressed state is larger than a width of the recess.

10. The hearing device according to claim 1, wherein the first filter material has a first pore size, and wherein the second filter material has a second pore size larger than the first pore size of the first filter material.

11. The hearing device according to claim 1, wherein the second filter material has a second pore size that is anywhere from 50 pores per inch (PPI) to 250 PPI.

12. The hearing device according to claim 1, wherein the first filter material has a first pore size that is anywhere from 400 pores per inch (PPI) to 2000 PPI.

13. The hearing device according to claim 1, wherein the second filter material is hydrophilic or hydrophobic.

14. The hearing device according to claim 1, wherein the second filter material of the second filter device extends across a central region of the second filter device.

15. The hearing device according to claim 1, wherein at least a part of the second filter device is configured to apply a force towards a part of the wall.

16. The hearing device according to claim 1, wherein the second filter material of the second filter device at least partially covers the microphone inlet.

17. The hearing device according to claim 1, further comprising a circuit board between the first filter device and the microphone.

18. The hearing device according to claim 17, wherein the circuit board has a circuit board opening forming a part of the microphone inlet.

19. The hearing device according to claim 1, wherein the wall of the housing is an overhanging wall, and wherein a peripheral portion of the second filter device is below the overhanging wall.

20. The hearing device according to claim 1, wherein the second filter material intersects a longitudinal axis of the microphone inlet.

21. The hearing device according to claim 1, wherein the second filter device is configured to collect one or more of particles, debris, dirt, dust, earwax, water, moist, sweat, cerumen, or dead skin.

* * * * *